May 9, 1967
JAMES E. WEBB
ADMINISTRATOR OF THE NATIONAL AERONAUTICS
AND SPACE ADMINISTRATION
PURGE DEVICE FOR THRUST ENGINES
3,318,096
Filed Jan. 19, 1966
2 Sheets-Sheet 1
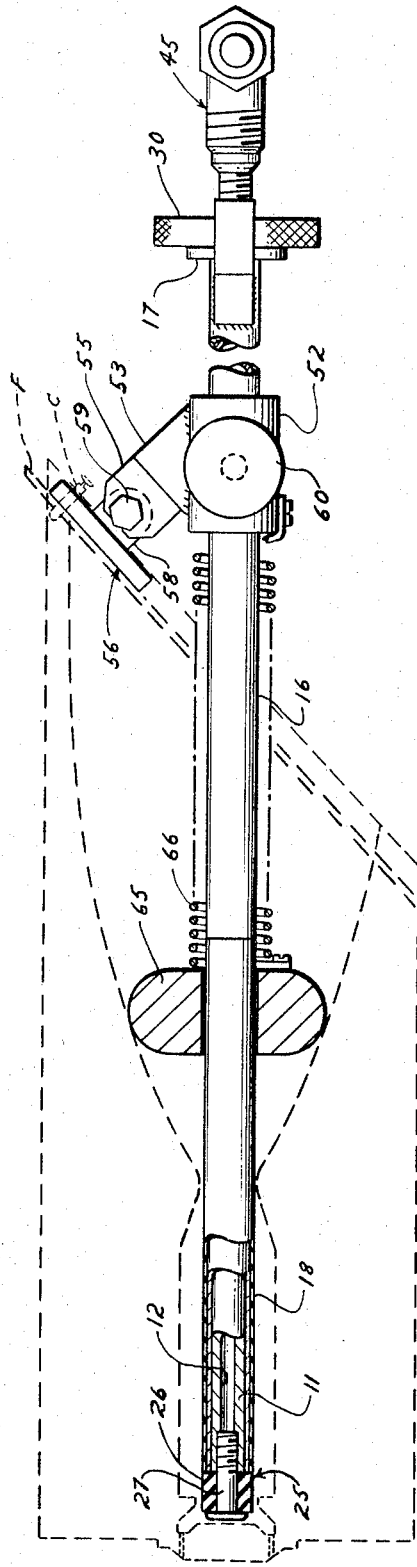
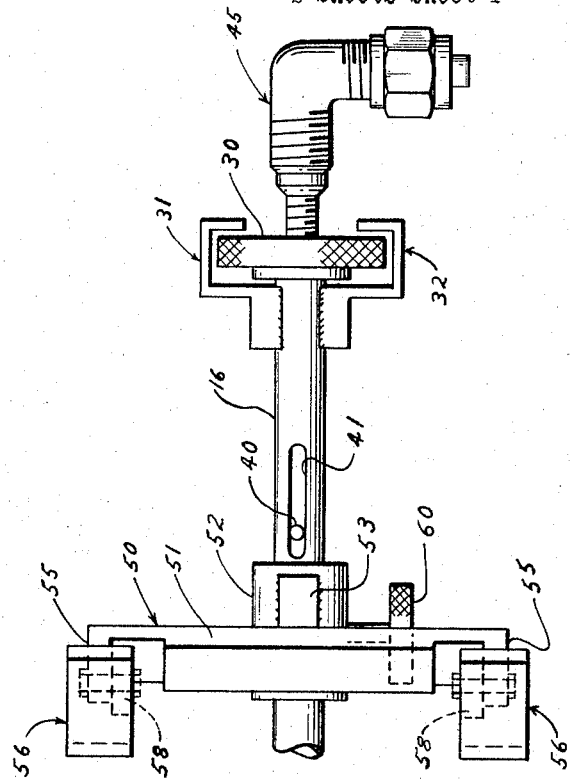
Vincent M. Partsch
INVENTOR.
BY
ATTORNEYS

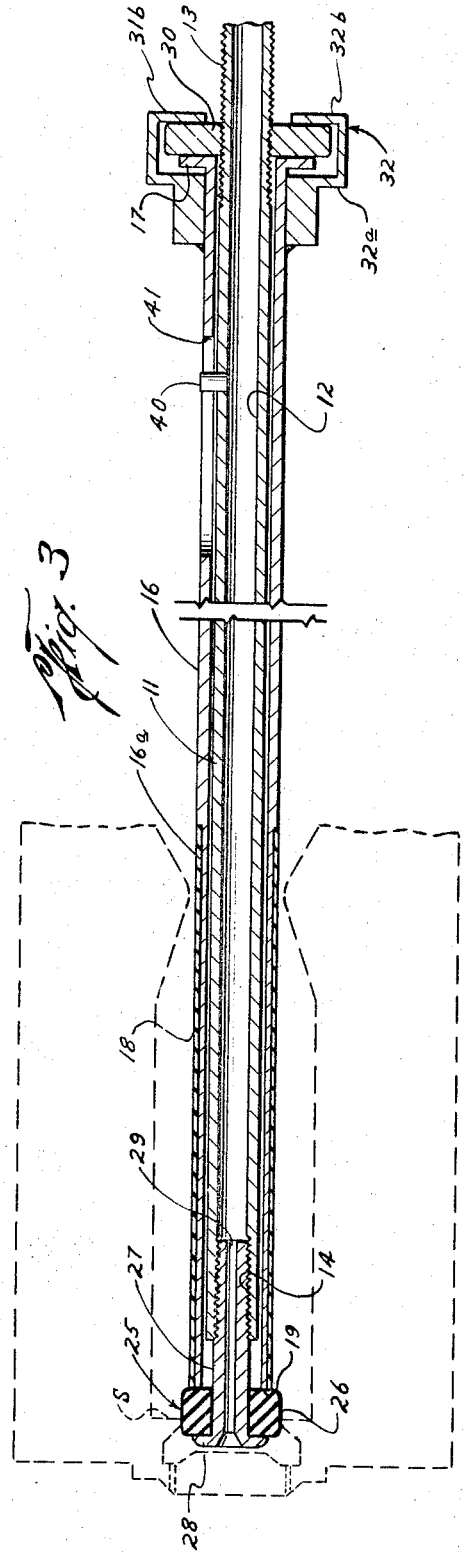

3,318,096
PURGE DEVICE FOR THRUST ENGINES
James E. Webb, Administrator of the National Aeronautics and Space Administration, with respect to an invention of Vincent M. Partsch, Simi, Calif.
Filed Jan. 19, 1966, Ser. No. 521,755
9 Claims. (Cl. 60—258)

This invention relates to a device for use in purging fuel lines, and more particularly to a fixture which is useful in back purging of thrust engines.

When operations are performed on thrust engines, it is the usual result that contaminants such as metal particles, carbons, liquids, or the like, enter into the propellant injector system. Back purging of the engine is usually required to clear the system. Heretofore, back purging operations have been accomplished by use of a device which is attachable to the minor diameter of the thrust chamber throat. By the technique using such a device, the purging fluid is fed through the thrust chamber and any contaminants located in the thrust chamber "upstream" of the throat are likely to be picked up and forced into the injector orifices with resulting damage to the valve seat and the injector system, and with possible clogging of the system. Instant failure and complete loss of the entire thrust chamber is a frequent occurrence with use of this technique.

The back purge device of this invention which is intended to overcome the limitations attendant to the prior art procedures and devices, is designed to be mounted and locked onto a thrust chamber in a position whereby the purging fluid is delivered directly into the injector splash region of the thrust chamber, whereby a purging operation may be accomplished without interference by contaminants in the thrust chamber. The device comprises a tubular mandrel and a stainless steel actuator tube sleeved thereover which are insertable lengthwise into a thrust chamber. The tubular mandrel is provided at one end with an expansible seal means which is expansible in response to relative longitudinal movement of the mandrel within the actuator sleeve in the direction away from the seal means end of the mandrel. At its other end, the mandrel is equipped with a fitting to which a source of high pressure purging fluid may be attached.

For a purging operation the device is inserted into the thrust chamber until the expansible seal means end of the device bottoms against the injector face. A centering means in the form of a doughnut-shaped nylon member which is sleeved over the outer actuator tube and spring-biased toward the expansible seal means end of the mandrel automatically centers the purge device in a coaxial position in the thrust chamber. Means mounted on the mandrel and cooperable with the outer sleeve are then actuated for accomplishing a controlled retraction of the mandrel relative to the outer tube sleeve, and thereby effecting an expansion of the seal means. The seal means then sealingly engages with the inner wall of the thrust chamber or the injector splash plate, if one is provided. The device also includes a clamping assembly which is adjustably positionable along the length of the outer sleeve and is cooperably engageable with the flange of the thrust chamber for maintaining the purge device in clamped operative position. In this condition of the device, purging fluid under pressure is deliverable directly to the propellant injector system, and any contaminants in the thrust chamber are bypassed so as not to interfere with the purging operation.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 1 is a side view, partly in section, showing the purge device of this invention in centered position within the thrust chamber of a thrust engine preparatory to placing the device in a locked operative condition;

FIG. 2 is a top view of the inlet end portion of the purge device showing the attachment means for connecting to a source of purge fluid and the mounting of the adjustable clamping mechanism;

FIG. 3 is a sectional view showing the device of FIG. 1 installed in operative condition within a thrust chamber, with the centering means and adjustable clamping mechanism omitted for purposes of clarity;

FIG. 4 is a sectional view through an alternate form of expansible seal means which may be used with the device of this invention; and FIG. 5 is a longitudinal sectional view of the alternate form of the invention employing the expansible seal means of FIG. 4 and showing the seal means in expanded operative position in a thrust chamber.

Referring more particularly to the drawings, the purge device 10 of this invention, as shown in FIGS. 1 and 3, comprises an elongate tubular mandrel 11 which is provided with an axial bore 12 extending therethrough. The mandrel is preferably of stainless steel, and is provided with external threads 13 at one end, which is the inlet end of the device, and with internal threads 14 at its other end. The device includes an outer stainless steel tube 16 which is sleeved over the mandrel 11 and is slightly shorter. The sleeve 16 is provided with a radial flange 17 at the end thereof which corresponds to the inlet end of the mandrel. The other end portion of the sleeve 16 is covered by a tightly fitting sleeve 18 of heat shrinkable tubing which fits over a slightly reduced diameter portion 16a of the sleeve 16.

An expansible seal means 25, which comprises a rubber ring 26 fabricated of silicone or Buna-N rubber, is secured to the end of the tubular mandrel which constitutes the outlet end of the device. The rubber ring is held in substantially coaxial relationship with the mandrel by means of a hollow screw 27 which is received in the bore of the mandrel and is threadedly connected to the inner threads 14 of the mandrel. The expansible ring is sleeved over the shank of the screw which is provided with an enlarged head portion 28 and an axial bore 29 extending through the screw. The outer diameter of the rubber ring in its relaxed unexpanded condition, as shown in FIG. 1, is approximately equal to that of the sleeve 16. Consequently, the rubber ring is securely held on the screw in abutting engagement with the screw head 28 and the end 19 of the sleeve 16.

It is therefore apparent that the rubber ring is compressible between the head of the screw 27 and the end of the outer sleeve 16 of the device when the mandrel is moved longitudinally relative to the outer sleeve in the direction of the inlet end of the device. To provide means for accomplishing this movement off retraction of the tubular mandrel, a knurled brass actuating nut 30 is mounted on the inlet end of the mandrel on the threads 13. The nut 30 is of substantially larger diameter than the outer sleeve 16, and is held adjacent the flanged end of the outer sleeve by a pair of U-shaped retaining members 31, 32 which hold the actuating nut against the flange 17 on the end of the outer sleeve. The U-shaped restraining members are secured on the outer sleeve in a manner to overhang the flanged end thereof, with their respective legs 31a, 31b and 32a, 32b disposed to extend radially of the sleeve 16. As shown in FIG. 3, the restraining members are secured to diametrically opposed sides of the sleeve 16 by welding of the legs 31a and 32a to the sleeve. The restraining members are positioned over the actuating nut 30 so that the nut lies within the openings provided by the U-shape of the restraining members, and is held between the end flange 17 of the sleeve 16 and the legs 31b and 32b of the restraining members.

To prevent rotation of the mandrel 11 as the actuating nut is rotated, the mandrel is provided with a key 40 which protrudes radially from the surface of the mandrel and extends into a guide slot 41 provided in the outer sleeve. The guide slot extends longitudinally to permit only longitudinal movement of the mandrel relative to the sleeve, and to prevent relative rotary movement. Consequently, by rotating the actuating nut in the clockwise direction the tubular mandrel may be moved longitudinally through the outer sleeve toward its inlet end because of its threaded connection with the nut. This retraction of the mandrel relative to its sleeve 16 compresses the rubber ring 26 between the screw head 28 and the end 19 of sleeve 16, thereby resulting in a radial expansion of the ring.

The mandrel 11 is also provided at its inlet end with an appropriate fitting 45 to which the delivery conduit of a supply of pressurized purging fluid may be readily attached. The fitting is internally threaded at one end for attachment to the inlet end of the mandrel, and is externally threaded at its other end for attachment to the delivery conduit from the source of pressurized fluid. In operation of the device 10, it is inserted into the thrust chamber assembly until the screw head 28 at the expansible means end of the device abuts the injector face of the thrust chamber. The device is then in position to be installed in operative condition in the thrust chamber in which a radial expansion of the expansible seal means effects a fluid-tight seal with the injector splash plate S which protrudes as an annular flange from the inner wall of the thrust chamber if the chamber is of this type, or with the chamber wall itself in the absence of a splash plate.

However, in order to maintain the device in position in the chamber, as shown in FIGS. 1 and 2, a clamping bracket assembly 50 is slidably mounted on the outer sleeve 16 of the device for adjusting its location along the sleeve 16. The clamping assembly comprises a transverse bracket arm 51 which is mounted on a cylindrical tubular member 52 which is sleeved over the outer sleeve and adapted for sliding movement thereon. The transverse bracket member 51 is rigidly joined at its center to a post-like appendage 53 which extends radially from the cylindrical sleeve 52. As joined to the post 53, the member 51 extends transversely with respect to the longitudinal axis of the tubular member 52, and therefore transversely with respect to the longitudinal axis of the mandrel.

At each end the transverse bracket arm 51 is provided with upright ears 55 to which shoe members 56 are pivotally attached. Each pivotal shoe comprises a rectangular plate portion 57 to which a perpendicular leg 58 is integrally joined. Each shoe 56 is pivotally mounted on the transverse bracket arm 51 by a bolt 59 which extends through the leg 58 and the upright ear 55 on the end of the transverse arm 51. The length of the transverse bracket arm 51 is such that the pivotal shoes 56 are adapted to simultaneously engage the annular engine flange F of the thrust chamber when the purge device 10 is installed in a thrust chamber for a purge operation. The flange F is located near the nozzle end and extends around the nozzle at an angle conforming to the particular scarf angle at the nozzle end. By use of a small C-clamp (shown in broken lines), the shoes of the clamping bracket assembly may be fastened firmly against the engine flange, the shoes being pivotally disposed at an angle conforming to the scarf angle. The bracket arm 51 can then be held in a selected location along the sleeve 16 by a set screw 60 which is screwed through an opening in the wall of the cylinder 52 to lock against the sleeve 16. It is possible, of course, to make the arm 51 extensible, whereby the device is readily adapted for use with a thrust chamber of different size. The pivotal shoes 56 might also be attached against the edge of the nozzle end, but with some greater risk of damage to the chamber.

To facilitate centering of the purge device 10 in a thrust chamber, and to reduce the possibility of scarring the interior walls of a thrust chamber during the installation or removal of the device, a centering means for the device is provided in the form of a doughnut-shaped nylon member 65 which is sleeved over the tubular sleeve 16. The nylon member 65 is attached at one end of the cylinder 52 of the clamping assembly. The smooth surface of the nylon member 65 therefore engages the inner wall of the expansion nozzle portion of the thrust chamber near the throat of the chamber when the device is installed in the chamber as shown in FIG. 1. The spring 66 serves to hold the nylon member against the chamber wall near the chamber throat. The nylon member thereby permits only a substantially coaxial position of the device 10 in the chamber and reduces the possibility of other parts of the device contacting and scarring the chamber wall.

Installation of the purge device 10 into a thrust chamber for a purge operation is as follows. The device is placed carefully into the thrust chamber assembly with the expansible means end of the device passing through the throat of the rocket engine until the screw head 28 bottoms against the injector face. In this position of the device, the nylon ball or doughnut 65 engages the wall of the chamber, and by the biasing action of the spring 66 serves to automatically center the device in the chamber. The clamping assembly 50 is then released by loosening the set screw 60 and is slid forward along the tubular sleeve 16 until the pivotal shoes 56 bottom flush against the engine flange. Small C-clamps C are then applied to lock the shoes in place. With slight hand pressure the outer tubular sleeve 16 is pushed in the forward direction, and the actuating nut 30 is turned in the clockwise direction until tight. The turning of the nut 30 results in a slight retraction of the mandrel relative to the outer sleeve 16, and an expansion of the expansible means 25 which engages the wall of the chamber in a sealing fluid-tight relation therewith. In this condition of the device the set screw 60 is then tightened to lock the clamping bracket assembly to the sleeve 16. A purge fluid supply line carrying helium, Freon, or the like, is then attached to the fitting 45 and the device is therefore in installed operative condition in the thrust chamber as shown in FIG. 3. It should also be obvious, of course, that to remove the device 10 from the chamber, the procedure described above need only be reversed.

It will be noted that in the installed operative condition of the device 10 the rubber ring sealingly engages the injector splash plate S and prevents escape of purging fluid into the thrust chamber. A slightly different form of expansible seal means which is used in a modification of the device 10 is shown in FIGS. 4 and 5.

As shown in FIG. 4, the expansible seal means 70 comprises a hollow screw 71 having a conical shaped head 72 and a bore extending lonigtudinally through the screw. The maximum diameter of the screw head 72 corresponds approximately to the outer diameter of the heat-shrinkable rubber sleeve 18. An expansible rubber cylinder 73 is sleeved over the end of the tubular mandrel 11 and extends beyond the end thereof to embrace the conical surface of the screw head. The rubber cylinder is provided with a reduced outer diameter portion 73a which is received in an enlargement 16a of the bore through the tubular sleeve 16. As the actuating nut 30 is turned to move the mandrel to the right, as viewed in FIG. 5, the conical head of screw 72 is forced part way into the bore of the rubber cylinder 73. The rubber cylinder slides over the conical surface of the screw head and is expanded outwardly as shown in FIG. 5 to sealingly engage the injector splash plate.

It will therefore be seen that a novel device for purging thrust engines, and the like, is disclosed herein. It is particularly designed for delivering a puring fluid directly to the injector region of a thrust engine, thereby bypassing contaminants in the thrust chamber which might otherwise interfere with the purging operation and produce irreparable damage. Various changes, of course, may be made in the materials used in this device. The centering ball 65 may be either nylon or Teflon, or of any other suitable material which will not damage the usual Fiberglas lining of the thrust chamber or cause impregnation of metallic particles into the lining. The heat shrinkable sleeve 18 which protects the throat of the thrust chamber from scarring is fabricated of a heat shrinkable silicone rubber, such as "Silastic," a commercially available product.

It should also be understood that the foregoing disclosure relates only to preferred embodiments of the invention, and that it is intended to cover all changes and modifications of the examples in the invention herein chosen for the purposes of the disclosure and which do not constitute departure from the spirit and scope of the invention.

What is claimed and desired to be secured by Letters Patent is:

1. A device for use in back purging a thrust engine of the type compirsing a propellant injector system and a thrust chamber, said device comprising:
    a tubular mandrel having a bore extending axially therethrough, said mandrel having an inlet and adapted to be connected to a source of purging fluid;
    an expansible seal means mounted on the other end of said mandrel;
    an actuator sleeve mounted on said mandrel in sleeved relationship thereto, said sleeve having an outer diameter of a size whereby said device is adapted to be inserted into the thrust chamber of a thrust engine in a substantially coaxial relationship thereto with said expansible seal means adjacent the injector face of the thrust engine; and
    means mounted on said mandrel for effecting a controlled longitudinal movement of said mandrel relative to said sleeve, said seal means being expansible in response to longitudinal movement of said mandrel when said mandrel moves longitudinally relative to said sleeve in the direction of said inlet end, whereby said seal means is adapted to be expanded into fluid-tight sealing engagement with the inner wall of a thrust chamber when said device is inserted into the thrust chamber with said seal means adjacent the injector face of the thrust engine.

2. A device of the character set forth in claim 1, further including an automatic centering means mounted on said mandrel and operative by engagement with the inner wall of a thrust chamber to guide the insertion of said device into the thrust chamber and to maintain said device in a coaxial position in the chamber after its insertion.

3. A device of the character set forth in claim 2, further including clamping means slidably adjustable along the length of the actuator sleeve, and means for locking said clamping means in a selected fixed location on the actuator sleeve, said clamping means being engageable with the nozzle end portion of the thrust chamber and adapted to be attached thereto for maintaining said device in a clamped operative position in said thrust chamber when the seal means has been expanded into sealing engagement with the inner wall of the thrust chamber.

4. A device of the character set forth in claim 1, further including clamping means slidably adjustable along the length of the actuator sleeve to a selected fixed position thereon, said clamping means being engageable with the thrust chamber of a thrust engine for maintaining said device in a clamped operative position in said thrust chamber when the seal means has been expanded into sealing engagement with the inner wall of said thrust chamber.

5. A device as defined in claim 3 wherein said clamping means is in the form of a bracket arm extending transversely of said actuator sleeve and slidably mounted thereon for movement to a selected location on said sleeve, said bracket arm having shoe members at opposite sides of the actuator sleeve adapted to engage the nozzle end portion of the thrust chamber, said shoe members being pivotally mounted on the bracket arm, whereby they are adapted to conform to the scarf angle of said nozzle end for firm engagement therewith.

6. A device for use in back purging a thrust engine of the type comprising a propellant injector system and a thrust chamber with an injector splash plate within said chamber adjacent injector region, and an external flange on the nozzle end of the chamber, said device comprising:
    a tubular mandrel having a bore extending axially therethrough, said mandrel having an inlet end adapted to be connected to a source of pressurized purging fluid;
    an expansible seal means mounted on the other end of said mandrel;
    an actuator sleeve mounted on said mandrel in sleeved relationship thereto, said sleeve having an outer diameter of a size whereby said device is adapted to be inserted into the thrust chamber of a thrust engine in a substantially coaxial relationship thereto with said expansible seal means adjacent the injector region of the thrust engine; and
    means mounted on said mandrel for effecting a controlled longitudinal movement of said mandrel relative to said sleeve, said seal means being expansible in response to longitudinal movement of said mandrel when said mandrel moves longitudinally relative to said sleeve in the direction of said inlet end, whereby said seal means is adapted to be expanded into fluid-tight sealing engagement with the injector splash plate of the thrust chamber when said device is inserted into the thrust chamber with said seal means adjacent the injector region of the thrust engine.

7. A thrust engine purging device as defined in claim 6, wherein the expansible seal means is in the form of a rubber ring sleeved on the shaft of a hollow screw having an enlarged screw head and threadedly connected in coaxial relation with the mandrel, said rubber ring being radially expansible by compression between the screw head and the adjacent end of the actuator sleeve by selective relative longitudinal movement of the mandrel and actuator sleeve.

8. A thrust engine purging device as defined in claim 6, further including:
    clamping means slidably adjustable along the length of the actuator sleeve, and means for locking said clamping means in a selected fixed location on the actuator sleeve, said clamping means being engaged with the external flange on the nozzle end of the thrust chamber and adapted to be attached thereto for maintaining said device in a clamped operative position in said thrust chamber when the seal means has been expanded into sealing engagement with the injector splash plate.

9. A thrust engine purging device as defined in claim 2 wherein said centering means is slidably mounted on said actuator sleeve, and is in the form of a sleeve member having a surface of revolution adapted to conformingly engage the inner wall of the nozzle portion of the chamber, said sleeve member being spring-biased towards the expansible means end of said device.

References Cited by the Examiner
UNITED STATES PATENTS

| | | | |
|---|---|---|---|
| 3,115,010 | 12/1963 | Collier | 60—200 |
| 3,273,585 | 9/1966 | Patch | 137—240 |

References Cited by the Applicant
UNITED STATES PATENTS

| | | |
|---|---|---|
| 1,419,070 | 6/1922 | Mays. |
| 1,565,863 | 12/1925 | Murphy. |
| 2,953,248 | 9/1960 | Troland. |

MARK NEWMAN, *Primary Examiner.*

D. HART, *Assistant Examiner.*